United States Patent [19]
Wagner et al.

[11] Patent Number: 4,913,453
[45] Date of Patent: Apr. 3, 1990

[54] SERVICE CAR FOR STORING AND MARKING AVAILABLE TOOLS

[75] Inventors: Günter Wagner, Nörtershausen; Hans Pohlenz, Boppard, both of Fed. Rep. of Germany

[73] Assignee: Stabilus GmbH, Koblenz-Neuendorf, Fed. Rep. of Germany

[21] Appl. No.: 212,893

[22] Filed: Jun. 29, 1988

[30] Foreign Application Priority Data

Jul. 16, 1987 [DE] Fed. Rep. of Germany ....... 3723464

[51] Int. Cl.⁴ .............................................. B62B 1/00
[52] U.S. Cl. .................................... 280/79.2; 211/133; 248/123.1; 248/297.1
[58] Field of Search ............... 280/47.34, 47.35, 47.41, 280/79.1 R, 79.1 A, 79.3; 248/123.1, 297.1; 211/133, 59.3; 108/144, 147, 137

[56] References Cited

U.S. PATENT DOCUMENTS 4,466,628 8/1984 Zerver ............................ 280/79.1 R
4,779,878 10/1988 Betts et al. ............................ 108/147

FOREIGN PATENT DOCUMENTS 525896  3/1939 United Kingdom.
642003  2/1948 United Kingdom.
771268  7/1955 United Kingdom.
942960  6/1961 United Kingdom.
1119686 8/1986 United Kingdom.

Primary Examiner—Charles A. Marmor
Assistant Examiner—Richard Camby
Attorney, Agent, or Firm—Brumbaugh, Graves, Donohue & Raymond

[57] ABSTRACT

A service car for storing and making available tools, accessories and the like comprises a travelling base. At least one column extends upwards from said travelling base. At least one platform is vertically movable along the column. A balancing gas spring is provided within the column. This balancing gas spring acts onto the platform opposite to the action of gravity.

24 Claims, 4 Drawing Sheets

SERVICE CAR FOR STORING AND MARKING AVAILABLE TOOLS

BACKGROUND OF THE INVENTION

Service cars are frequently used in factories and in repair shops. The service cars can be closed and are used in closed condition for storing tools. The service cars are opened in that two or more platforms or trays are vertically moved along columns. The platforms or trays can be secured in various heights. These platforms or trays can be used for carrying tools.

STATEMENT OF THE PRIOR ART

In known service cars the platforms or trays are elevated solely by manual force. Due to their own weight and due to the weight of the tools carried thereon considerable manual forces are necessary for lifting and securing the platforms or trays.

OBJECT OF THE INVENTION

It is an object of the present invention to provide a service car which can be opened and closed with reduced manual force.

SUMMARY OF THE INVENTION

A service car for storing and making available tools, accessories and the like comprises a travelling base. At least one column extends upwards from said travelling base. At least one platform is vertically movable along said at least one column. Balancing means are provided within said at least one column. These balancing means act onto the platform opposite to the action of gravity.

By the balancing means at least part of the weight of the platform is counter-balanced so that a reduced manual force is necessary for vertically moving the platform.

One tries to adapt the balancing action of the balancing means exactly to the weight of the platform. As, however, the weight of the tools lying on the platform varies, one must consider the possibility of deviations from the balanced condition. This means that one is either obliged to assist upward movement by manual force or to overcome the balancing means in downward direction by manual force.

If the balancing means are selected such that their lifting action overcomes the weight of the platform and the goods lying thereon, the upper end position of the platform is obtained by the balancing means, on the one hand, and by abutment means, on the other hand. In this case the lowermost position of the platform must be secured by securing means. If the balancing action is smaller than the maximum weight of the platform and the tools, securing means are also necessary, which maintain the platform in the elevated position.

In order to completely enclose the tools, the travelling base is formed as a container having a base wall, a side wall and an upper opening defined by said side wall such that the platform or platforms are at least partially receivable by the container through the opening.

In order to easily move the service car on ground, the travelling base can be provided with a plurality of travelling wheels.

In order to move the service car in varying directions, at least part of the travelling wheels can be castor wheels.

In order to stabilize the platform and prevent tilting of the platform, the travelling base is provided with an elongate horizontal axis and two columns are provided adjacent to respective ends of the elongate horizontal axis.

In case the travelling base is provided with a side wall, a plurality of columns may be provided inside said side wall.

In order to provide a large number of tools in readily accessible condition, a plurality of platforms are located one above the other. The balancing means engage an upper one of said plurality of platforms and at least one lower platform is suspended at said upper platform by flexible suspension means. Such the movement of a plurality of platforms is synchronized.

In case of a plurality of platforms, securing means may be provided for securing said upper platform in at least one position along said at least one column. If the balancing action overcomes the weight of all platforms, the securing means are necessary to maintain the platforms in their lowermost position. If, on the other hand, the balancing means are insufficient for overcoming the weight of the platforms, the securing means are needed for maintaining the platforms in the elevated position.

A cover member may be movable along said at least one column above said at least one platform. It is possible that the balancing means act onto the cover member and that at least one platform is suspended at the cover member by flexible suspension means. In such case the cover member may be provided with securing means for securing it in at least one position along said at least one column.

As however the cover member is of relatively low weight, it is preferable that even in case of provision of a cover member the balancing means act onto said at least one platform. Even then said at least one platform may be suspended at said cover member by flexible suspension means and securing means may be provided on said cover member for securing said cover member in at least one position along said at least one column. Such the necessary stroke of the balancing means is reduced and nevertheless the cover member and the platform or platforms may be brought to elevated positions by one action.

According to a preferred embodiment the travelling base is a container having a base plate with an elongate axis and a side wall. Two columns extend upwards from said base plate within said side wall in substantially vertical direction. A plurality of platforms is vertically guided on the columns one above the other. Balancing means are provided in each of the columns. The balancing means act onto the uppermost of the platforms. At least one lower platform is suspended at the uppermost platform by flexible suspension means. A cover member is guided on the columns above the uppermost of the platforms. The cover member is provided with securing means for securing it in at least one position along the columns. The uppermost platform is suspended at the cover member by flexible suspension means. The cover member may be secured in its uppermost position. The elevated position of the platforms may be secured through the various groups of flexible suspension means even if the balancing means are not sufficient to overcome the gravity of all platforms. On the other hand, the cover member may be secured in its lowermost or closing position so that all platforms are maintained within the container even if the weight of the loaded platforms is not sufficient to overcome the balancing force of the balancing means.

The platforms may be shaped as trays or otherwise shaped such as to maintain the tools in good order. Even the cover member may be used for carrying tools during operation.

In order to transmit the balancing action of the balancing means to the respective platform or cover member, said at least one column may be provided with at least one substantially vertical slot and said balancing means may be provided with at least one lateral engagement arm which engages one of said platform and a cover member.

While the balancing means may be also mechanical springs, it is preferred that said balancing means comprise at least one gas spring. The gas spring may be of the well known type having a cylinder member with a cavity therein, a volume of pressurized gas being provided within said cavity and a piston rod extending through one end of said cylinder. An outer end of said piston rod may be fixed to one of said travelling base and said at least one column. The cylinder member may be in balancing connection with said at least one platform.

The main advantage of such a gas spring is that it is adapted in its natural shape to the shape of a column. A further advantage is that the balancing force of the gas spring does not considerably vary in response to inward and outward movement of the piston rod. This is particularly true if the cross-sectional area of the piston rod is small as compared with the cross-sectional area of the cavity.

In order to adapt readily accessible gas springs to the shape of the column, the cylinder member is surrounded by a spacer unit, said spacer unit being guided within said at least one column. This spacer unit may be provided with at least one laterally extending engagement arm which passes through a slot of said column and is in load-transmitting connection with said at least one platform.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

The invention will be explained in greater detail hereinafter with reference to an embodiment shown in the accompanying drawings, in which.

DESCRIPTION OF THE PREFERRED EMBODIMENT

Figure 1:
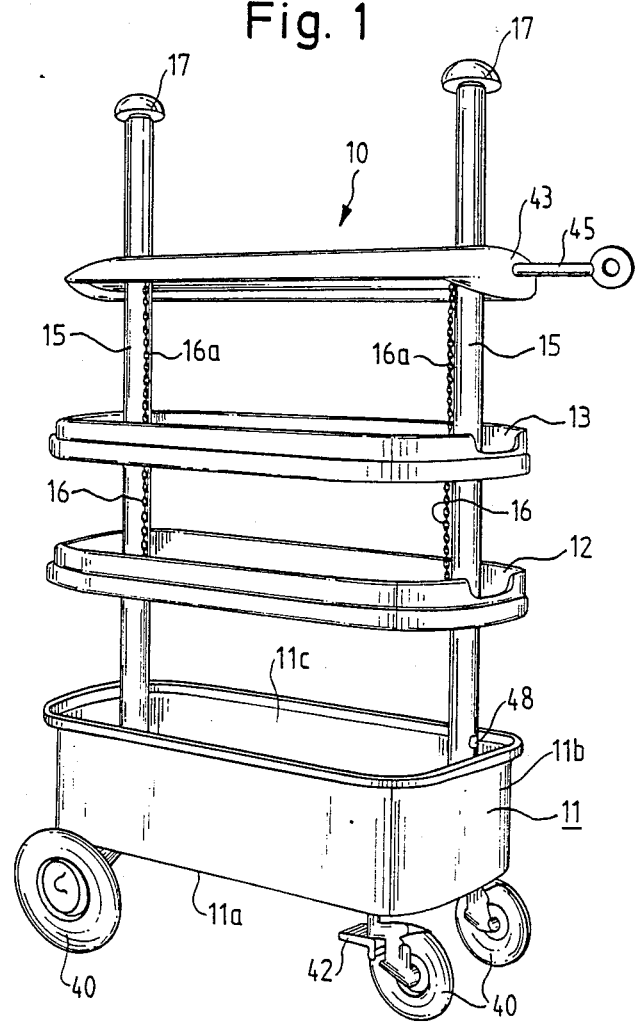
FIG. 1 shows an overall view of a service car of this invention.
Figure 4:
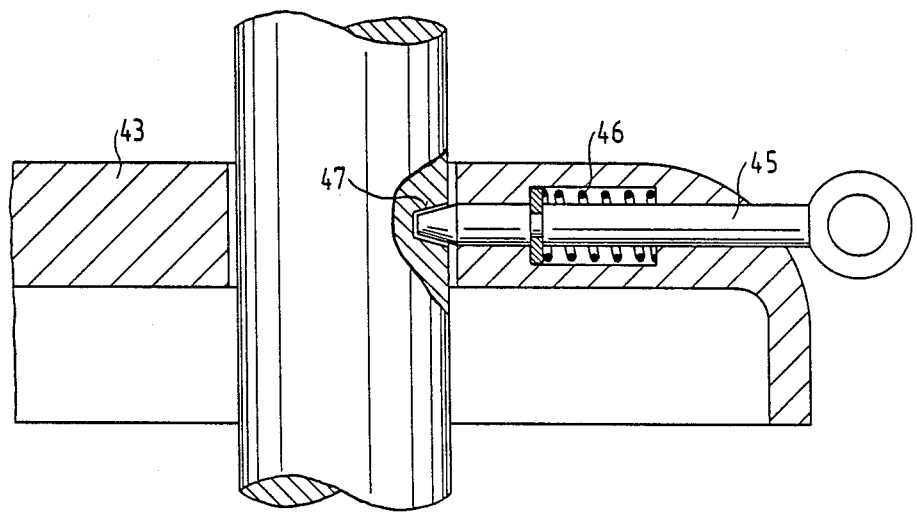
FIG. 4 shows securing means for securing a cover member with respect to a column.

The service car of FIG. 1 is designated by 10. It comprises a container 11 with a base plate 11a and a side wall 11b. An upwards directed opening 11c is defined by the side wall 11b. The base plate 11a is provided with travelling wheels 40, at least two of these travelling wheels being castor wheels and being provided with a brake 42. Two substantially vertical columns 15 are fixed to the base plate 11a inside the side wall 16. On the columns 15 there are guided two platforms 12 and 13 and a cover member 43. The platforms 12 and 13 can be completely lowered into the container 11 through the opening 11c such that the cover member 43 can close the opening 11c. The cover member 43 is provided with a securing bolt 45 which is shown in more detail in FIG. 4. This securing element 45 can be operated by hand and is biased by a spring 46 towards engagement with a column 15. The column 15 is provided with one securing recess 47 corresponding to the most elevated position of the cover member 43 as shown in FIG. 1. A further securing recess 48 is provided on the column 15 in a position corresponding to the closing position of the cover member 43 with respect to the container 11.

The upper platform 13 is suspended at the cover member 43 by chains 16a, whereas the lower platform 12 is suspended at the platform 13 by chains 16. In FIG. 1 the cover member 43 is secured at the columns 15 by the securing bolt 45. A similar securing bolt may be provided at the left-hand end of the cover member 43, as seen in FIG. 1. The platform 13 is suspended by the chains 16a and the platform 12 is suspended at the platform 13 by the chains 16.

Figure 2:
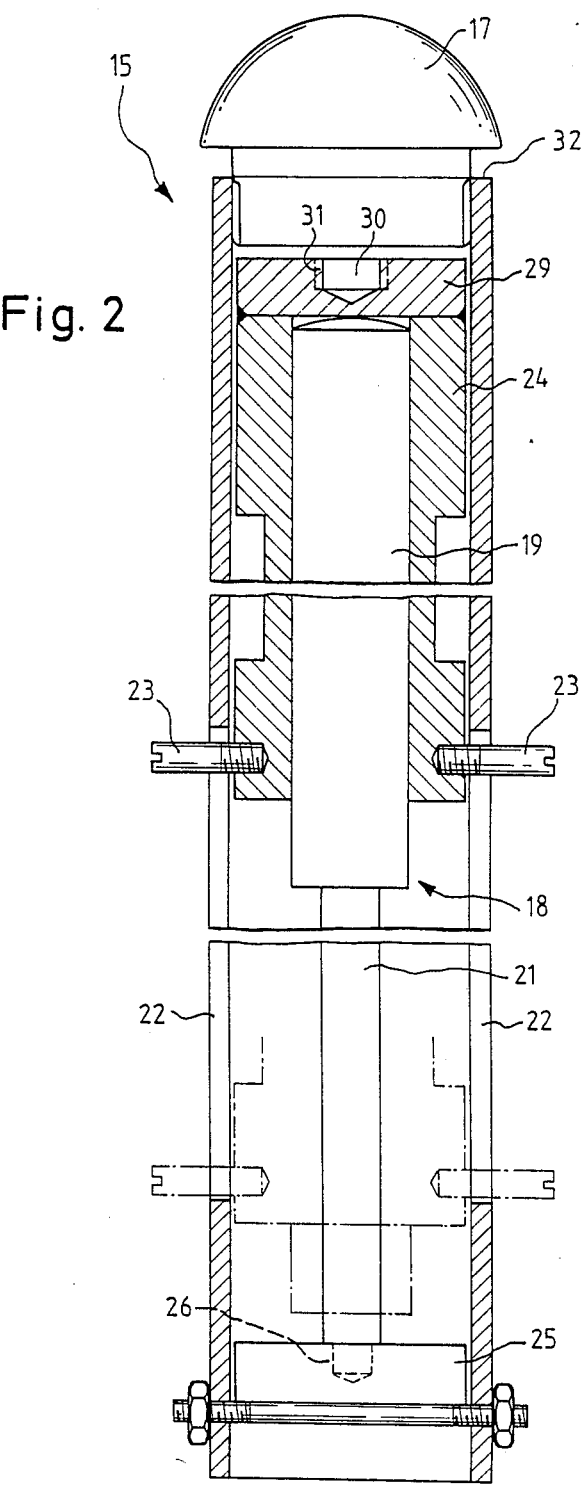
FIG. 2 shows a longitudinal section through a column being provided with gas spring balancing means.

According to FIG. 2 a gas spring 18 is provided within each column 15. The gas spring 18 comprises a cylinder 19 and a piston rod 21. The downwardly directed piston rod 21 is fixed by its lower end 26 to a support member 25 which is secured with respect to the column 15 and/or the base plate 11a. The cylinder member 19 is housed within a spacer unit 24 which is slidingly guided within the column 15. The spacer unit 24 is closed at its upper end by a cover plate 29. This cover plate 29 is provided with a bore 30 having thread means 31. Lateral engagement arms 23 are threadedly fixed to the spacer unit 24 and pass through slots 22 of the column 15. These lateral engagement arms 23 engage the upper platform 13 at the lower side thereof.

Figure 3:
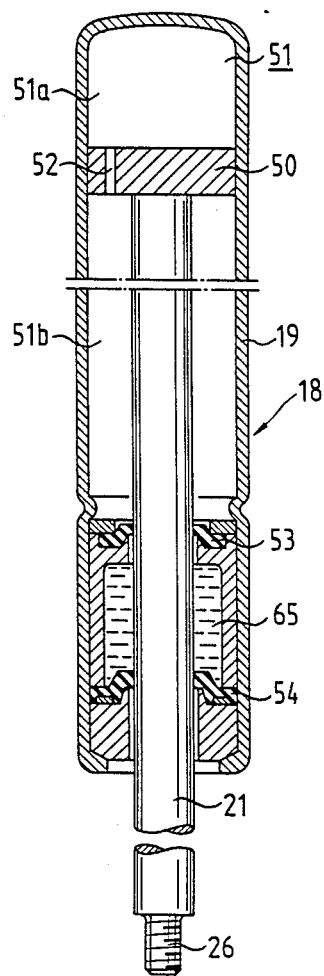
FIG. 3 shows a longitudinal section through a gas spring as used in FIG. 2.

The gas spring 18 is shown in more detail in FIG. 3. The piston rod 21 is provided with a piston 50 inside the cavity 51 of the cylinder member 19. The cavity 51 is subdivided by the piston 50 into two working chambers 51a and 51b. The two working chambers 51a and 51b are interconnected by a bore 52 extending through the piston 50. The cavity 51 is sealed by a first group of sealing means 53 and a second group of sealing means 54. An oil chamber 55 is provided between the sealing means 53 and 54. Pressurized gas is contained within both working chambers 51a and 51b. The piston rod 21 is biased by the pressurized gas in downward direction. Movement of the piston rod member 21 with respect to the cylinder member 19 is damped by the reduced cross-section of the bore 52.

According to FIG. 2 the piston rod member 21 is stationary and the cylinder member 19 is axially movable with respect to the piston rod 21. Due to the pressurized gas within the cavity 51 the cylinder member 19 is biased upwards in FIG. 2. The upwards directed force acting onto the cylinder member 19 is transmitted through the spacer unit 24 and the engagement arms 23 to the upper platform 13 in FIG. 1. It is assumed now that the upwards directed force of the gas springs is sufficient to overcome the weight of the loaded platforms 12 and 13. When the cover member 43 is closed and secured in closed condition with respect to the container 11 by the securing bolts 45 engaging the securing recesses 48, the platforms 12 and 13 are retained within the container 11. When the securing bolts 45 are withdrawn the gas springs 18 lift the platform 13 up to the position shown in FIG. 1. This position is defined by the engagement arms 23 abutting the upper ends of the slots 22. During the upward movement of the platform 13 the chains 16 are straightened. After the chains 16 have been straightened, the lower platform is lifted by the upper platform 13 through the chains 16 up to the position of FIG. 1. The cover member 43 is to be lifted by hand into the position shown in FIG. 1 and is then secured by the securing bolts 45 engaging the recesses 47. The cover member 43 may be lifted by the platform 13 up to the upper position of the platform 13 so that it must be manually lifted only for the remainder of the path between the position of the platform 13, as seen in FIG. 1, and the position of the cover member 43, as seen in FIG. 1.

If the force of the gas spring is not sufficient to overcome the weight of the platforms 13 and 12 and the weight of the cover member 43, the upward movement of the cover member 43 must be manually assisted. This manual force acting onto the cover member 43 is transmitted to the platform 13 and the platform 12 after the chains 16a and 16, respectively, have been straightened. Even if manual assistance is necessary for lifting the cover member 43, the platform 13 and the platform 12, the necessary force for lifting this components is reduced due to the presence of the gas springs.

It is to be understood that the gas spring may also engage by its engagement arms 23 the cover member 43. In this case even manual lifting of the cover member is avoided if the spring force of the gas springs is sufficient to lift the cover member 43, the platform 13 and the platform 12 one after the other.

As can be seen form FIG. 2, the upper ends of the columns 15 are provided with spherical knobs 17. These spherical knobs 17 are intended for the operator to move the service car on ground.

The threaded bore 30 in the cover plate 29 is provided for assisting insertion of the spacer unit 24 and the gas spring 18 into the column 15.

Tools, accessories and the like may be positioned on the platforms 12 and 13 and on the bottom of the container 11. During operation additionally tools may be positioned on the top side of the cover member 43.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

What is claimed is:

1. A service car for storing and making available tools, accessories and the like comprising: a travelling base (11), at least one column (15) extending upwards from said travelling base (11) and having at least one substantially vertically extending slot (22), at least one platform (12, 13) vertically movable along said at least one column (15), balancing means (18) disposed within said at least one column (15) being operatively connected with at least one lateral engagement arm (23) passing through and vertically moveable along said slot (22), said engagement arm (23) acting onto one of said platform (12, 13) and a cover member (43) opposite to the action of gravity, wherein said engagement arm (23) is vertically movable along said slot (22) with one of said platform and cover member.

2. A service car as set forth in claim 1, securing means (45) being provided for securing said at least one platform (12, 13) in at least one position along said at least one column (15).

3. A service car as set forth in claim 2, said securing means (45) being adapted for securing said at least one platform (12, 13) in a lowermost position.

4. A service car as set forth in claim 2, said securing means (45) being adapted for securing said at least one platform (12, 13) in an elevated position.

5. A service car as set forth in claim 1, said travelling base (11) being a container having a base plate (11a), a side wall (11b) and an upper opening (11c) defined by said side wall (11b), said at least one platform (12, 13) being at least partially receivable by said container (11) through said opening (11c).

6. A service car as set forth in claim 1, said travelling base (11) being provided with a plurality of travelling wheels (40).

7. A service car as set forth in claim 6, at least part of said travelling wheels (40) being castor wheels.

8. A service car as set forth in claim 1, said travelling base (11) having one elongate horizontal axis, two columns (15) being provided adjacent to respective ends of said elongate horizontal axis.

9. A service car as set forth in claim 5, a plurality of columns (15) being provided inside said side wall (11b).

10. A service car as set forth in claim 1, a plurality of platforms (12, 13) being located one above the other, said balancing means (18) engaging an upper one (13) of said plurality of platforms (12, 13), at least one lower platform (12) being suspended at said upper platform (13) by flexible suspension means (16).

11. A service car as set forth in claim 10, securing means (45) being provided for securing said upper platform (13) in at least one position along said at least one column (15).

12. A service car as set forth in claim 1, a cover member (43) being movable along said at least one column (15) above said at least one platform (12, 13).

13. A service car as set forth in claim 12, said balancing means (18) acting onto said cover member (43), said at least one platform (12, 13) being suspended at said cover member (43) by flexible suspension means (16a).

14. A service as set forth in claim 12, said cover member (43) being provided with securing means (45) for securing it in at least one position along said at least one column (15).

15. A service car as set forth in claim 12, said balancing means (18) acting onto said at least one platform (12, 13), said at least one platform (12, 13) being suspended at said cover member (43) by flexible suspension means (16a), securing means (45) being provided on said cover member (43) for securing said cover member (43) in at least one position along said at least one column (15).

16. A service car as set forth in claim 1, said base member (11) being a container (11) having a base plate (11a) with an elongate axis and a side wall (11b), two columns (15) extending upwards from said base plate (11a) within said side wall (11b) in substantially vertical direction, a plurality of platforms (12, 13) being vertically guided on said columns (15) one above the other, balancing means (18) being provided in each of said columns (15), said balancing means (18) acting onto the uppermost (13) of said platforms (12, 13), at least one lower platform (12) being suspended at the uppermost platform (13) by flexible suspension means (16), a cover member (43) being guided on said column (15) above the uppermost (13) of said platforms (12, 13) said cover member (43) being provided with securing means (45) for securing it in at least one position along said columns (15), said uppermost platform (13) being suspended at said cover member (43) by flexible suspension means (16a).

17. A service car as set forth in claim 16, said securing means (45) being adapted for securing said cover member (43) in at least one of a container closing position and an elevated working position.

18. A service car as set forth in claim 17, said platforms (12, 13) being completely receivable within said container (11), said cover member (43) being adapted for closing said container (11) with said platforms (12, 13) received therein.

19. A service car as set forth in claim 1, said at least one platform (12, 13) being shaped as a tray.

20. A service car as set forth in claim 1, said balancing means (18) comprising at least one gas spring (18).

21. A service car as set forth in claim 1, said gas spring (18) having a cylinder member (19) with a cavity (51) therein, a volume of pressurized gas within said cavity (51), a piston rod (21) extending through one end of said cylinder (19), said piston rod (21) having an outer end (26) outside said cavity (51), said outer end (26) of said piston rod (21) being fixed to one of said travelling base (11) and said at least one column (15), said cylinder member (19) being in balancing connection with said at least one platform (12, 13).

22. A service car as set forth in claim 21, said cylinder member (19) being surrounded by a spacer unit (24), said spacer unit (24) being guided within said at least one column (15).

23. A service car as set forth in claim 22, said spacer unit (24) being provided with at least one laterally extending engagement arm (23) which passes through a slot (22) of said column (15) and is in load-transmitting connection with said at least one platform (12, 13).

24. A service car for storing and making available tools, accessories and the like comprising: a travelling base (11), at least one column (15) extending upwards from said travelling base (11), at least one platform (12, 13) vertically movable along said at least one column (15), at least one gas spring (18) having a cylinder member (19) with a cavity (51), a piston rod (21) extending through one end of said cylinder (19) and having an outer end (26) outside said cavity (51) fixed to one of said travelling base (11) and said at least one column (15), wherein said cylinder member (19) is in balancing connection with said at least one platform (12, 13).

* * * * *

UNITED STATES PATENT AND TRADEMARK OFFICE
CERTIFICATE OF CORRECTION

PATENT NO. : 4,913,453

DATED : April 3, 1990

INVENTOR(S) : Gunter Wagner and Hans Pohlenz

It is certified that error appears in the above-identified patent and that said Letters Patent is hereby corrected as shown below:

ON TITLE PAGE: Item 54 and Col. 1, line 1, "MARKING" should read --MAKING--;

Item 56, last line, "1986" should read --1966--;

Col. 5, line 28 "this" should read --these--;

Col. 5, line 36, "form" should read --from--;

Col. 6, line 49, "service" should read --service car--;

Col. 7, line 25, "claim 1" should read --claim 20--.

Signed and Sealed this

Thirteenth Day of August, 1991

Attest:

HARRY F. MANBECK, JR.

*Attesting Officer*    *Commissioner of Patents and Trademarks*